(12) United States Patent
Gibson

(10) Patent No.: US 7,827,731 B2
(45) Date of Patent: Nov. 9, 2010

(54) WEIGHTED FISHING LURE HAVING INTERCHANGEABLE LURE BODY

(75) Inventor: Stephen Gibson, Columbia, SC (US)

(73) Assignee: Normark Innovations, Inc., Minnetonka, MN (US)

( * ) Notice: Subject to any disclaimer, the term of this patent is extended or adjusted under 35 U.S.C. 154(b) by 232 days.

(21) Appl. No.: 12/111,393

(22) Filed: Apr. 29, 2008

(65) Prior Publication Data
US 2009/0265975 A1 Oct. 29, 2009

(51) Int. Cl.
*A01K 85/00* (2006.01)
(52) U.S. Cl. ..................................... 43/42.39
(58) Field of Classification Search ............... 43/42.39, 43/42.1, 42.36, 44.81, 42.38; *A01K 85/00*
See application file for complete search history.

(56) References Cited

U.S. PATENT DOCUMENTS

| | | | |
|---|---|---|---|
| 2,994,982 A * | 8/1961 | Murawski | 43/35 |
| 3,465,466 A | 9/1969 | Showalter | |
| 3,490,165 A * | 1/1970 | Thomassin | 43/42.09 |
| 3,497,987 A | 3/1970 | Perrin | |
| 3,611,614 A | 10/1971 | Ward | |
| 3,724,117 A | 4/1973 | Flanagan, Jr. | |
| 3,861,073 A | 1/1975 | Thomassin | |
| 3,883,979 A | 5/1975 | Williams, Jr. | |
| 4,196,884 A * | 4/1980 | Zeman | 249/55 |
| 4,672,768 A | 6/1987 | Pippert | |
| 4,771,567 A | 9/1988 | Cannon | |
| 4,843,754 A | 7/1989 | Spelts | |
| 4,887,377 A | 12/1989 | Morris | |
| 4,976,060 A | 12/1990 | Nienhuis | |
| 5,070,639 A | 12/1991 | Pippert | |
| 5,136,801 A * | 8/1992 | Pond | 43/42.39 |
| 5,564,220 A * | 10/1996 | Blicha | 43/42.32 |
| 5,628,138 A | 5/1997 | Murray, Jr. | |
| 5,678,350 A | 10/1997 | Moore | |
| 5,806,234 A | 9/1998 | Nichols | |
| 6,041,540 A | 3/2000 | Potts | |
| 6,266,916 B1 | 7/2001 | Dugan | |
| 6,393,757 B2 | 5/2002 | Bomann | |
| 6,718,683 B2 | 4/2004 | Hawkins | |
| 7,185,457 B2 | 3/2007 | Nichols | |
| 2003/0024150 A1 * | 2/2003 | Hawkins | 43/42.39 |
| 2005/0204607 A1 * | 9/2005 | Nichols | 43/42.37 |
| 2006/0260179 A1 * | 11/2006 | Guigo | 43/42.36 |

* cited by examiner

*Primary Examiner*—Son T Nguyen
*Assistant Examiner*—Shadi Baniani
(74) *Attorney, Agent, or Firm*—Dority & Manning, P.A.

(57) ABSTRACT

A fishing lure having a reusable and interchangeable lure body is generally disclosed. The lure body can be changed without having to cut and retie the fishing line to the fishing lure. The fishing lure has two separate components that can be interchanged: the weighted hook and the lure body. A fishing line can be tied to the weighted hook. Different lure bodies can be affixed to the weighted hook to be fished.

9 Claims, 3 Drawing Sheets

WEIGHTED FISHING LURE HAVING INTERCHANGEABLE LURE BODY

BACKGROUND OF THE INVENTION

Sport fishing is enjoyed around the world. From fresh water to salt water, a wide variety of fish species exist. Fishermen employ a variety of equipment and tackle depending upon the water being fished, the time of day, the species of fish sought, personal choice, and many other factors. A fishing lure, sometimes referred to as an artificial lure, is frequently a part of such equipment and tackle.

Lures can also be designed with features that make the lure realistic in a functional manner. Fins, diving planes, spinners, rattles and the like may be added in order to make the lure move and sound like a food source. Some lures may be specifically designed to operate on the water surface while others may function only when below.

Fishing lures are typically designed and decorated with the goal of replicating or mimicking the movement and appearance of a food source for the particular fish being sought. For example, such lure may take on the shape of a minnow, tadpole, frog, mouse, insect, salamander, another fish, or such other food source. The fisherman's hope is that by having a lure closely resembling or acting like a source of food, fish will be enticed into biting the lure.

In an effort to make the lure aesthetically realistic, a designer can use materials pigmented with the desired colors. For example, colored plastics or rubber may be used. In addition, a designer can paint or stain the external surface of the lure to achieve the desired color and marking characteristics. Decorative features such as scales, eyes, and fins may be painted onto the surface or otherwise added to the lure.

Fishermen often desire to change the appearance of the lure body while fishing, which requires changing the lure body. Depending on the type of lure being used, changing the lure body requires the fisherman to cut the fishing line and retie a new lure on the line. Constantly retying the line to different lures is time consuming and tedious. Other types of lures have a jig head tie onto a line, with a separate lure body attached to the jig head, where the jig head defines the head of the lure and the lure body defines the body and the tail. The jig head has an attachment mechanism that is inserted into the lure body to secure the lure body to the jig head while fishing. Removing the lure body from the attachment mechanism of the jig head usually tears the lure body rendering it unusable. Thus, changing the lure body on a jig head type fishing lure ruins the lure body, requiring the fisherman to use a new lure body each time the lure body is changed on the jig head.

As such, a need currently exists for a fishing lure having a reusable and interchangeable lure body without having to cut and retie the fishing line to the fishing lure.

SUMMARY OF THE INVENTION

Objects and advantages of the invention will be set forth in part in the following description, or may be obvious from the description, or may be learned through practice of the invention.

In one embodiment, a fishing lure having a removable lure body is generally disclosed. The fishing lure includes a weighted hook and a lure body. The weighted hook has a hook shaft extending from a molded weight. An anchoring arm also extends from the molded weight. The lure body defines a top aperture connected to an inner cavity and is configured to receive the weighted hook into the inner cavity through the top aperture without having to cut a fishing line that is connected to the eyelet. The lure body also includes an anchor post positioned such that the anchoring arm of the weighted hook can be positioned adjacent to the anchor post to secure the weighted hook within the inner cavity of the lure body.

In another embodiment, a method of positioning a lure body on a weighted hook attached to a fishing line is generally disclosed. The weighted hook is attached to a fishing line and is inserted into an inner cavity defined by the lure body through a top aperture. An anchoring arm of the weighted hook is positioned adjacent to an anchor post of the lure body to secure the weighted hook within the inner cavity of the lure body. The hook shaft of the weighted hook can then be inserted through the inner cavity and out of the lure body.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
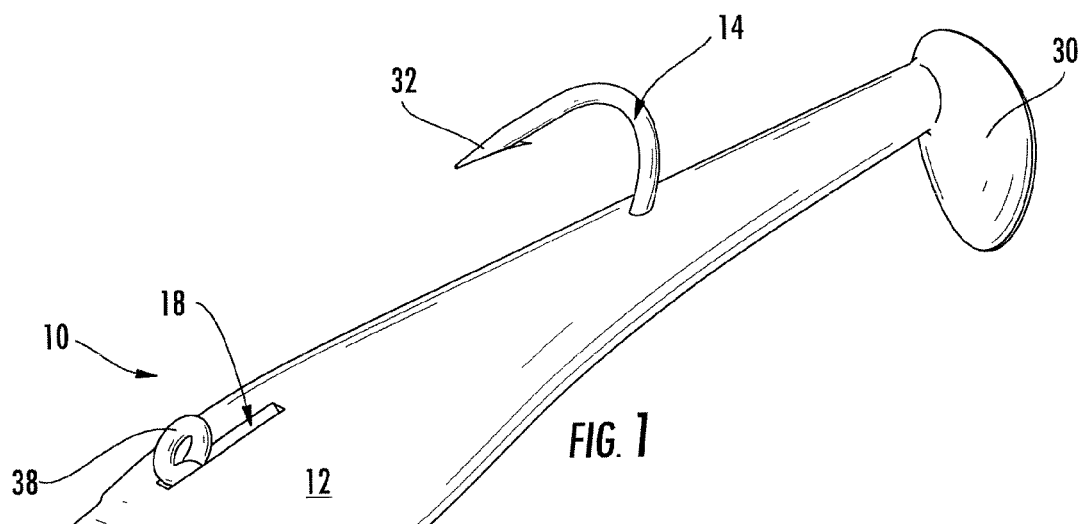
FIG. 1 is a perspective view of an exemplary embodiment of the fishing lure described herein.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

In general, the present disclosure is directed to a fishing lure having a reusable and interchangeable lure body. The lure body can be changed without having to cut and retie the fishing line to the fishing lure. Thus, the fisherman can quickly change the lure body while fishing without having to constantly retie the fishing line to the lure and without substantially damaging the lure body for future use.

Figure 2:
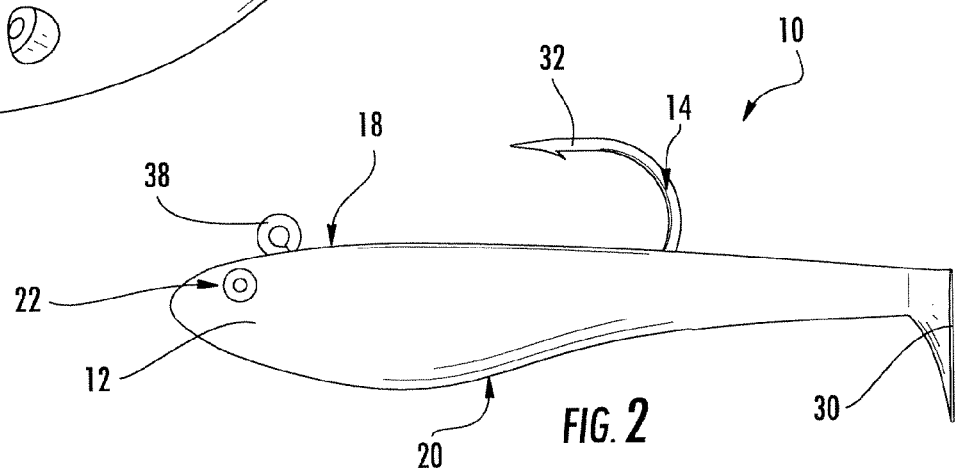
FIG. 2 is a side view of the exemplary embodiment shown in FIG. 1.
Figure 3:
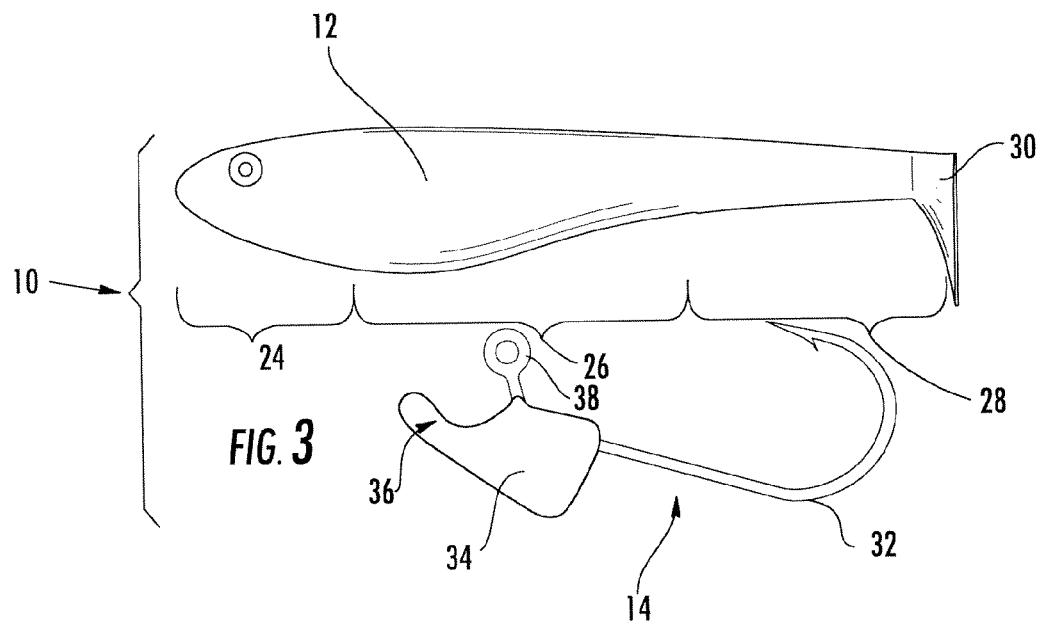
FIG. 3 is a side view of the exemplary embodiment of FIG. 1 showing the separate components of the lure body and the weighted hook.

The fishing lure of the present invention has two separate components: the weighted hook and the lure body. The fishing line is tied to the weighted hook. Different lure bodies can be affixed to the weighted hook to be fished. Referring to the exemplary embodiment shown in FIGS. 1 and 2, a fishing lure 10 is shown having a lure body 12 positioned on a weighted hook 14.

I. Lure Body

Figure 4:
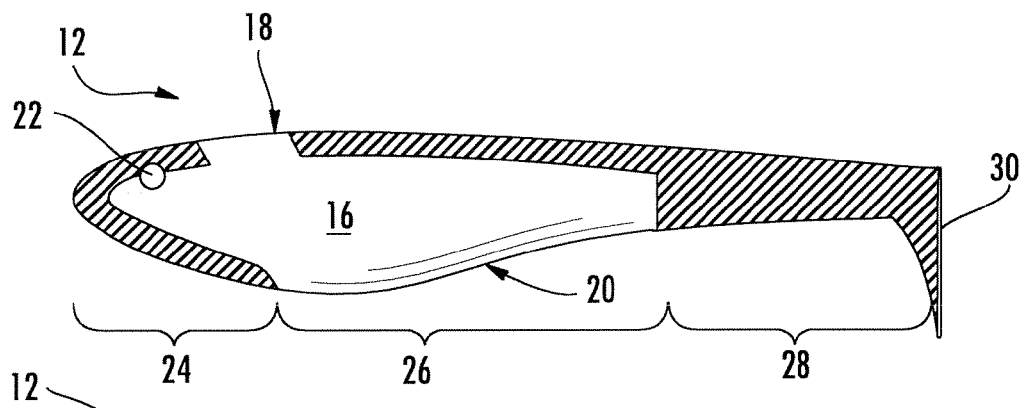
FIG. 4 is a side, cut-away view of the lure body of the exemplary embodiment of FIG. 1.
Figure 5:
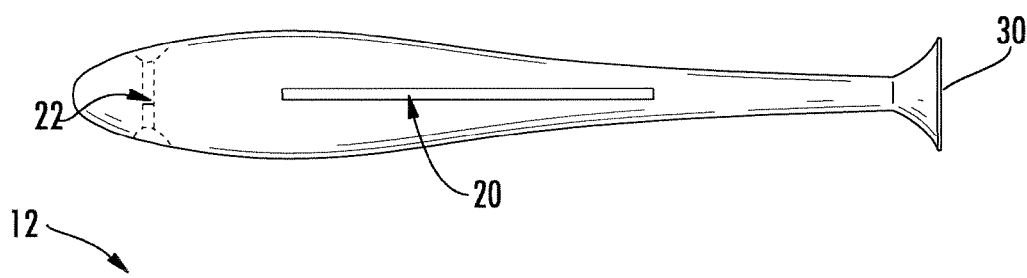
FIG. 5 is a bottom view of the lure body of the exemplary embodiment of FIG. 1.
Figure 6:
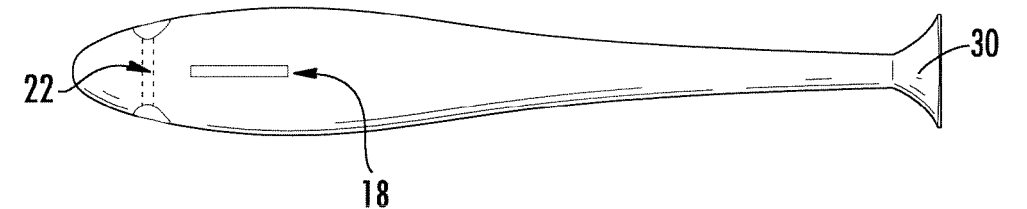
FIG. 6 is a top view of the lure body of the exemplary embodiment of FIG. 1.

The lure body, as more particularly shown in FIGS. 4-6, defines an inner cavity 16 configured for receiving the weighted hook 14. The lure body 12 also defines a top aperture 18 and a bottom slit 20 connecting to the inner cavity 16. The inner cavity 16 extends internally within the lure body 12 from the head section 24 of the lure body 12 into the middle section 26.

Although shown having a bottom slit 20, the lure body can be constructed without a bottom slit 20. In this embodiment, the inner cavity 16 is sufficiently large to accommodate the weighted hook 14 into the inner cavity 16 through the top aperture 18 and allow the weighted hook 14 to be properly positioned for fishing. This embodiment is particularly useful with relatively large lures, such that the inner cavity 16 can allow the weighted hook 14 to be positioned for fishing.

The inner cavity 16 is configured to receive and to substantially enclose the weighted hook 14 during fishing. As such, the inner cavity 16 can be shaped and sized to correspond to the desired shape and sized of the weighted hook 14 to which it is to be matched while fishing.

An anchor post 22 extends across the lure body 12 in the head section 24, in a position forward (i.e., toward the head section and away from the tail section) of the top aperture 18. The anchor post 22 is shown in FIGS. 1-10 doubling as the decorative eye of the bait-fish. The anchor post 22 is generally a stiff, inflexible pole (e.g., solid or hollow) that is configured to couple with the weighted hook 14 while fishing. Specifically, the anchor post 22 can help keep the lure body 12 on the weighted hook 14 while fishing and fighting a hooked fish.

The anchor post 22 can be constructed from metal, plastic, or any other material that can provide sufficient strength to help secure the weighted hook 14 within the inner cavity 16 of the lure body 12 while fishing.

The lure body 12 is generally shaped to resemble a bait fish or another type of bait configured to attract fish. In the embodiments shown in FIGS. 1-7, the lure body 12 resembles a bait fish. However, the lure body 12 can be designed to resemble bait fish or other aquatic species that are typical food sources for the targeted fish. Also, lure body 12 can include various ornamental designs, such as eyes, fins, scales, coloring, and the like. In fact, lure body 12 can be shaped to resemble many different types of bait fish while still remaining within the scope of the present disclosure.

The tail section 28 of lure body 12 can define a tail-fin 30 that adds more life-like movement to lure 10 while being fished. In the shown embodiments of FIGS. 1-7, the tail-fin 30 is shaped like a paddle, to form a so-called "paddle tail". While being trolled or retrieved through the water, tail-fin 30 causes the tail section 28 of lure body 12 to move side-to-side, creating a life-like swimming motion for lure 10. Of course, tail-fins other than a paddle tail can be used in accordance with the present invention. In fact, the tail section 28 can be shaped to form any shape desired. Varying the shape of the tail section 28, especially the tail-fin 30, can control the movement of the fishing lure 10 when being fished. The present invention is amiable to differently shaped tail sections 28, since the fisherman can quickly can the lure body to a differently shaped lure body to alter the movement of the fishing lure 10 when fishing.

Generally, the lure body 12 can be made of any material suitable for being shaped into a lure body. The lure body 12 will typically be molded from soft, malleable plastic material as is commonly known in the art.

II. Weighted Hook

The weighted hook 14 generally includes a hook shaft 32 connected to a molded weight 34. In one particular embodiment, the molded weight 34 can be cast over the end of the hook shaft 32 (opposite the barb) to create a weighted hook 14 that is a single piece. However, the hook shaft 32 and the molded weight 34 can be connected in any suitable manner.

The molded weight 34 includes an anchoring arm 36 and an eyelet 38. The anchoring arm 36 is configured to interact with anchor post 22 of lure body 12 to help secure the lure body 12 on the weighed hook 14 while fishing. The anchoring arm 36 extends in a direction opposite the hook shaft. As such, the anchoring arm 36 is configured to extend into the head section 24 of the inner cavity 16 of the lure body 12.

The anchoring arm 36 will be positioned under the anchor post 22 when inserted properly into the inner cavity 16 of the lure body 12. Thus, any pressure applied to the weighted hook 14, through attachment of the fishing line 40 to the eyelet 38, during fishing can be efficiently transferred to the lure body 12 through the interaction between the anchoring arm 36 and the anchor post 22.

In one embodiment, the anchoring arm 36 is gradually curved upward to extend about the anchor post 22 of the lure body 12. This curved shape can help secure the anchoring arm 36 within the forward section of the inner cavity 16 and underneath the anchor post 22. Additionally, the amount of contact between the anchoring arm 36 and the anchor post 22 can be increased.

The eyelet 38 is configured to allow a fishing line 40 be attached to the weighted lure 14. The fishing line 40 can be connected to the eyelet 38 by any suitable connection (e.g., tied, crimped, etc.), as is known in the art. Although the eyelet 38 is shown as being a circular loop, the eyelet 38 can be any shape or size capable of holding the fishing line 40 to the eyelet 38.

The hook shaft 32 is shown having a single hook. However, other shapes and sizes of hooks can be used with lure 10, including double and treble hooks.

The position of molded weight 34 gives lure 10 a center of gravity towards the head section 24 of lure body 12. This forward positioning of the weight in the head section 24 creates a forward center of gravity that helps keep lure 10 submerged while being fished. However, another type of diving element, such as a diving plane, can be utilized with lure 10. For example, in other embodiments, lure 10 can dive below the surface of the water by attaching a diving plane the head section of the lure 12. Diving planes are well known in the art to be effective for keeping unweighted lures beneath the water's surface.

III. Method of Changing the Lure Body on the Weighted Hook

A fisherman can change the lure body 12 on the weighted hook 14 without having to cut and re-connect the fishing line 40 to the eyelet 38. Thus, the fisherman can avoid wasting valuable fishing time cutting and re-connecting a new lure every time it is desired to change the lure's appearance.

FIGS. 7-10 sequentially show the method of changing the lure body 12 without having to cut and re-connect the fishing line 40 to the weighted hook 14.

Figure 7:
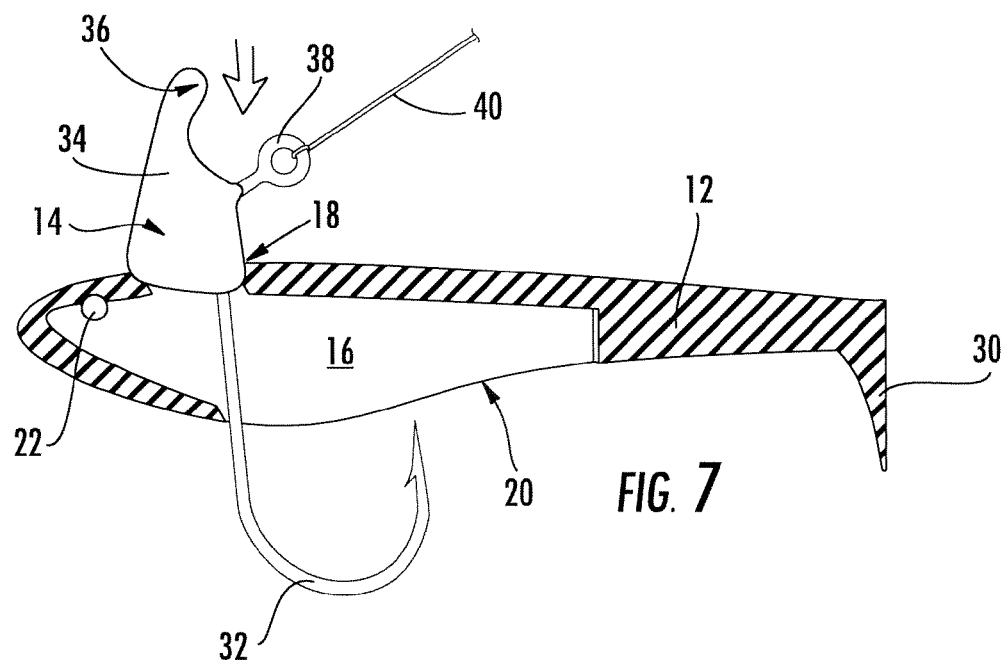
FIGS. 7-10 sequentially show an exemplary method of inserting the weighted hook of FIG. 3 into the lure body of FIGS. 3-6 without having to cut and retie the fishing line attached to the weighted hook through the side, cut-away views.

First, the weighted hook 14 is inserted through the top aperture 18 of the lure body 12 into the inner cavity 18. As shown in FIG. 7, the hook shaft 32 is inserted through the top aperture 18 first, followed by the molded weight 34. The top aperture 18 is just large enough to allow the molded weight 34 to pass through. In some embodiments, the top aperture 18 may actually be smaller than the molded weight 34; however, the top aperture 18 can be stretched or expanded due to its soft, malleable construction allowing the molded weight 34 to penetrate through to the inner cavity 16.

Figure 8:
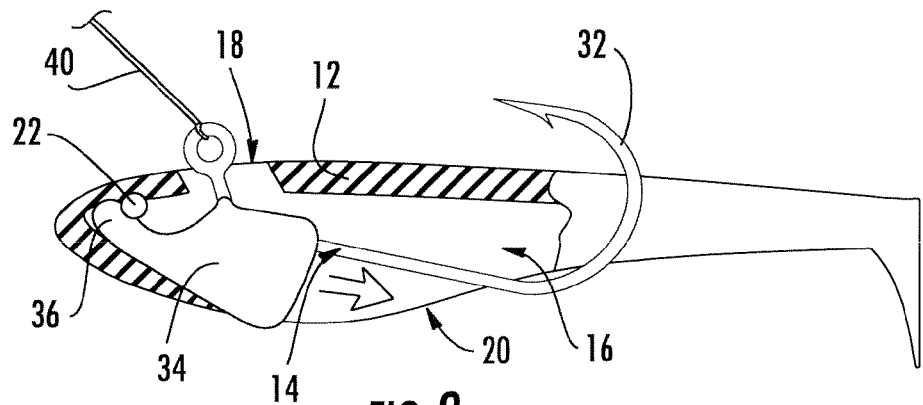

The anchoring arm 36 of the molded weight 34 is then positioned underneath the anchor post 22 of the lure body 12, as shown in FIG. 8. Thus, the anchoring arm 36 and the anchor post 22 couple to connect the lure body 12 to the molded weight 14 in a secure fashion. In the shown embodiment, the anchoring arm 36 is positioned in the forward portion of the inner cavity 16 under the anchor post 22 while the hook shaft 32 is outside of the inner cavity 16.

Figure 9:
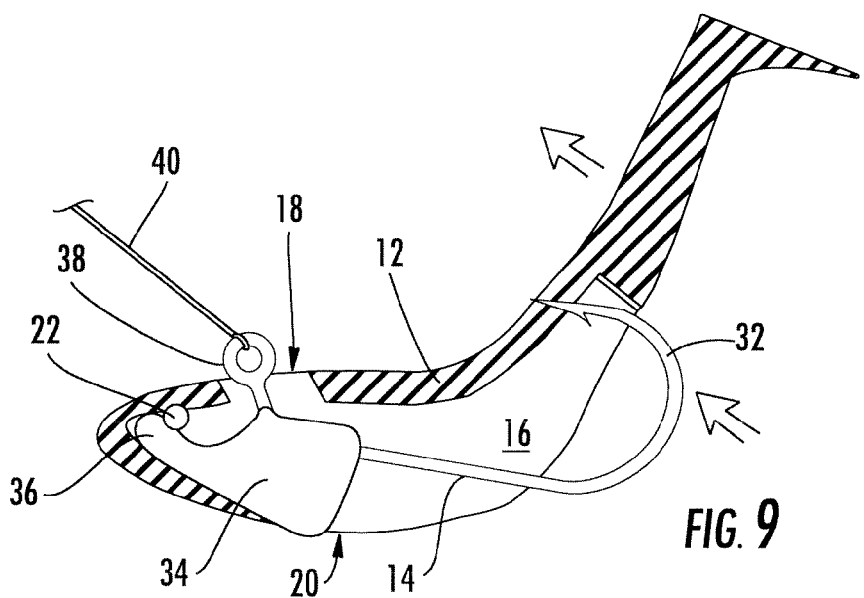
Figure 10:
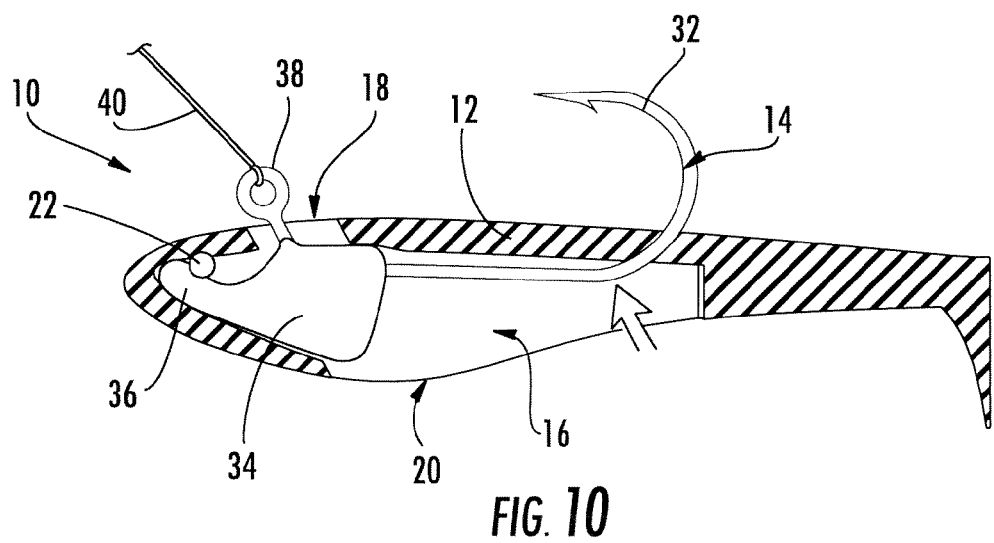

Finally, the hook shaft 32 is secured through the inner cavity 16 and out the upper surface of the lure body 12, as shown in FIGS. 9-10. In the shown embodiments, the hook shaft 32 forms a small aperture in the upper surface of the lure body (behind the top aperture 18). However, the lure body 12 can be manufactured with a second top aperture (not shown) configured to receive the hook shaft 32.

Removing the lure body 12 from the weighted hook 14 without cutting the fishing line 40 simply involves reversing the above described procedure.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A fishing lure having a removable lure body, the fishing lure comprising a weighted hook comprising a hook shaft extending from a molded weight in a first direction, wherein the molded weight comprises an anchoring arm extending from the molded weight in a second direction that is different than the first direction and an eyelet configured for attachment to a fishing line; and a lure body defining a top aperture a bottom slit, and an inner cavity, wherein the top aperture connect to the inner cavity and the bottom slit, wherein the lure body received the weighted hook into the inner cavity through the top aperture without having to cut the fishing line from the eyelet; and an anchor post positioned within the lure body, wherein the anchoring arm of the weighted hook is positioned adjacent to the anchor post to secure the weighted hook within the inner cavity of the lure body, wherein the hook shaft is secured through the inner cavity and out of the lure body through a hook shaft aperture, and wherein the eyelet extends through the top aperture of the lure body, and wherein the top aperture and the hook shaft aperture are positioned on a top surface of the lure body, and wherein the hook shaft aperture is behind the top aperture towards a tail section of the lure body.

2. A fishing lure as in claim 1, wherein the anchor post is positioned within the lure body forward of the top aperture, such that the anchor post is positioned farther away from a tail section than the top aperture.

3. A fishing lure as in claim 1, wherein the anchoring arm extends from the molded weight in a second direction that is substantially opposite than the first direction.

4. A fishing lure as in claim 1, wherein the anchoring arm is slightly curved.

5. A fishing lure as in claim 1, wherein the lure body is shaped to resemble a bait fish.

6. A fishing lure as in claim 5, wherein the anchor post defines two opposite ends, wherein each end forms a decorative eye on the lure body.

7. A fishing lure as in claim 1, wherein the anchor post comprises a metal post.

8. A fishing lure as in claim 1, wherein the lure body comprises a soft, malleable plastic material.

9. A fishing lure as in claim 1, wherein the top aperture is shorter in length than the bottom slit.

* * * * *